Patented Feb. 27, 1923.

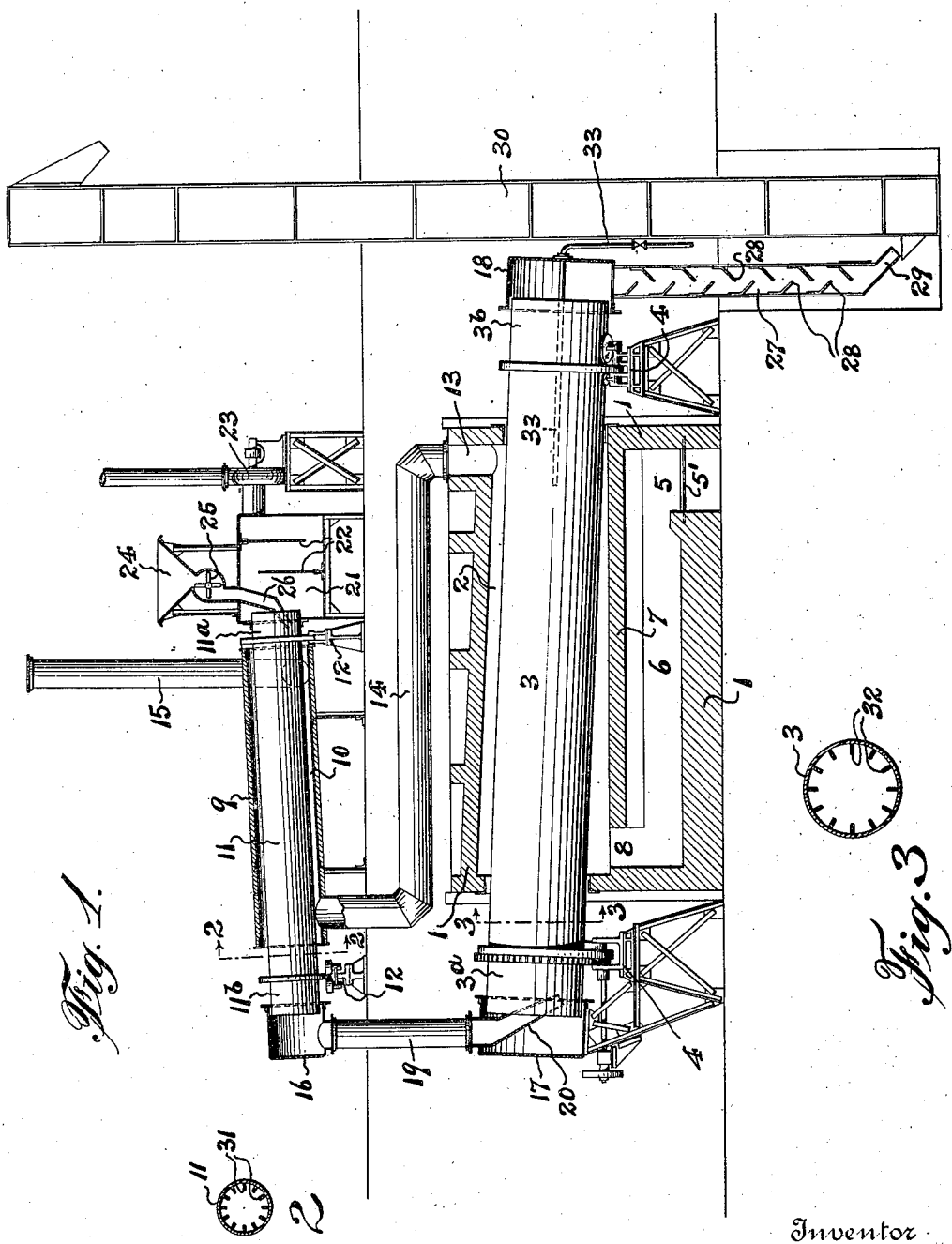

1,446,857

UNITED STATES PATENT OFFICE.

FREDERICK PEITER, OF BROOKLYN, NEW YORK, ASSIGNOR TO ROBERT SAYRE KENT, INC., OF BROOKLYN, NEW YORK, A CORPORATION OF NEW YORK.

KILN.

Application filed April 21, 1920. Serial No. 375,548.

*To all whom it may concern:*

Be it known that I, FREDERICK PEITER, a citizen of the United States, residing at Brooklyn, in the county of Kings and State of New York, have invented certain new and useful Improvements in Kilns; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in apparatus for revivifying fuller's earth; and the invention has reference, more particularly, to an improved construction of rotary kiln adapted to rid fuller's earth of volatile hydrocarbon in such a manner that the latter will not crack and thus coat the granules of earth with hard gas carbon, and, furthermore, which will bake the earth under such proper control of temperature that all danger of vitrification thereof is eliminated, and assuring at the same time that all remaining traces of carbon are removed.

The baking of fuller's earth, which has been used in filters or filtration processes, to revivify the same, requires much more care than does an initial baking of the same, since, when so used, it accumulates a varying carbon content. This accumulation of carbon content is due to the absorption of the hydrocarbons which cause the coloration of the medium which was filtered, and such content varies according to the thoroughness of the washing of the earth after such use, and according to the amount of the hydrocarbon used in washing which is retained by the earth. In revivifying the earth for use again in subsequent filtration processes, the said carbon content should be entirely removed, and the most feasible way of accomplishing its removal is to allow the carbon to unite with oxygen forming carbon dioxide. Since, however, such reaction liberates considerable heat, care must be taken that the earth does not become over-heated and consequently spoiled by vitrification.

All petroleum distillates have the property of cracking when heated beyond their boiling points; the hydrogen, under such circumstances, going to its gaseous state and the carbon being deposited as hard gas carbon. Where a small amount of liquid hydrocarbon is mixed with a large amount of granular substance, such as fuller's earth, and this mass receives its heat from the outside, the vapor of the hydrocarbon must pass through the hotter layers of earth, thus the hydrocarbon becomes superheated and cracks, which results in the deposit of hard gas carbon coatings on the outside of the granules sealing up the pores of the latter and rendering them impervious to hydrocarbon liquids they subsequently are supposed to decolorize in the filter. It will be apparent that earth thus coated with hard gas carbon is as useless for filtration purposes as a vitrified earth. This carbon coated condition of the earth is produced in retort kilns which receive insufficient air or no air at all, and also in ordinary rotary kilns in which a considerable depth of earth is moving. If, however, the carbon is removed with air, care being taken not to overheat, the earth easily recovers its original vitality. It is, therefore, the object of my present invention to provide an apparatus which is especially designed to remove the hydrocarbon content from fuller's earth in such a way as to prevent the formation and deposit of hard gas carbon, and at the same time to so bake the earth under controlled temperature that vitrification of the granules thereof cannot take place.

Other objects of the present invention, not at this time more particularly enumerated, will be clearly understood from the following detailed description of the same.

The invention is clearly illustrated in the accompanying drawing, in which Figure 1 represents a longitudinal section of the novel rotary kiln made according to and embodying the principles of my present invention; the kiln drums being shown in elevation; Figure 2 represents a detail transverse section of the drier drum; and Figure 3 represents a similar detail section of the kiln drum.

Referring now to said drawing, the reference-character 1 indicates a suitable housing, usually built of brick. The upper portion of the interior of the housing provides a main rotary kiln drum chamber 2, through which extends the main kiln drum 3. Said main kiln drum comprises a cylindrical hollow steel shell which extends longitudinally through said chamber 2, its exterior ends being supported upon cradle frames or pedestals 4 for rotation about its longitudinal axis, said kiln drum inclining downwardly from its receiving end —3ª— toward its discharge end —3ᵇ—. The lower portion of the interior of the housing 1 provides a fire-box 5 having the usual fuel supporting grate 5′, and from which extends beneath said drum chamber 2 a combustion chamber 6. Said combustion chamber and fire box is separated from said drum chamber 2 by means of a transverse arch partition 7, which is provided, at the end opposite said firebox, with a port 8 affording communication between said combustion chamber 6 and said drum chamber 2.

Located above said housing 1 is an insulated casing 9 providing a drier drum chamber 10, through which extends a rotary drier drum 11, the same comprising a cylindrical hollow steel shell which extends longitudinally through said drier drum chamber, its exterior ends being supported upon cradle frames or pedestals 12 for rotation about its longitudinal axis, said drier drum inclining downwardly from its receiving end —11ª— toward its discharge end —11ᵇ—.

The rear end of said kiln drum chamber 2 is provided with an outlet port 13 which is connected by piping or some suitable form of conduit 14 in communication with one end of said casing 9, the opposite end of the latter being connected in communication with a stack or flue 15.

The discharge end of said drier drum 11 is closed by a suitable hood 16, and in like manner the receiving end of said kiln drum 3 is closed by a suitable hood 17, while its discharge end is likewise closed by a similar hood 18.

The arrangement of said drier drum 11 relative to said kiln drum 3 is such, that the discharge end —11ᵇ— of the former is positioned above the receiving end —3ª— of the latter. The said discharge end of said drier drum is connected with the receiving end of said kiln drum by means of a vertical conduit or drop well 19 which is interconnected between the hoods 16 and 17 of said respective drier and kiln drums, said drop well being provided at its lower end, within said hood 17, with a chute portion 20 for deflecting the material discharged from said drier drum into the receiving end —3ª— of said kiln drum.

Mounted adjacent to the receiving end —11ª— of said drier drum, and connected in communication with the open receiving end of same, is a dust box or collector 21, provided with any desired arrangement of internal baffle walls 22. Connected in communication with said dust box or collector 21 is an exhaust fan 23 of any desirable construction.

Mounted adjacent to the receiving end of said drier drum is a feed hopper 24 provided at its lower end with a rotary feeder paddle 25, beyond which extends a suitable delivery chute 26, the latter passing through said dust box or collector 21 so as to enter said receiving end of said drier drum, and thereby serving to direct the material, fed from the hopper 24, into said drier drum.

Connected with the hood 18 at the discharge end of said kiln drum is a vertical cooler well 27 into which the material is discharged from said kiln drum. Said cooler well is provided upon opposite walls with a series of staggered internal downwardly inclined baffle plates 28, over which the falling material tumbles to maintain the falling mass of granules in a separated or open relation so that the same are readily reached by the cool air entering through the discharge spout 29 of the said cooler well.

The said discharge spout 29 of said cooler well communicates with a suitably arranged conveyor mechanism 30 adapted to carry away the treated material to a suitable place of deposit.

In operating the device, constructed as above described, the fuller's earth, or other material to be treated, is fed from the hopper 24 into the receiving end of the drier drum 11 while the latter is rotated, the same traveling through the drier drum and being tumbled about therein by the longitudinal flights 31 with which said drier drum is provided, and thence being discharged through the drop well 19, to enter and travel through the kiln drum 3, being tumbled about in said kiln drum by the longitudinal flights 32 with which the latter is provided, to be thence discharged through the cooler well 27 to the conveyor mechanism 30. Air enters through the cooler well and travels upwardly through the same and thence through the kiln drum and drier drum to pass out through the dust box 21 under the pull of the exhaust fan 23 It will thus be clear that the travel or movement of the air is the reverse of that of the material treated. As the material passes through the drier drum it is sifted by the action of the flights 31 through a reversely flowing or counter current of heated air (said air deriving its heat in a manner subsequently made clear), so that each granule of the material comes in contact, many times, with said heated air, whereby the moisture and imprisoned hydrocarbon is removed from the granules, without giving said hydrocarbon opportunity to become super-heated, and consequently preventing cracking thereof and a resultant deposit of a hard carbon coating upon said granules.

Upon being discharged from the drier drum 11, the material falls through the drop well 19 into the receiving end of said kiln drum 3, having been preheated during its passage through the drier drum. The material is thoroughly baked or burned during its travel through the kiln drum, as it is sifted by the flights 32 through the heat maintained within said kiln drum, and is finally discharged therefrom to fall through the cooler well 27. The cool air entering at the bottom of said cooler well and flowing upwardly therethrough extracts heat from the baked or burned material discharged from the kiln drum, thus superheating the air before it enters the latter while at the same time cooling the material.

The heated air thus delivered to flow through the kiln drum supplies oxygen which readily combines with any carbon content of the material being burned or baked within said kiln drum. This carbon content will not start to unite with oxygen of the air until a temperature of about 750 degrees is attained within said kiln drum; therefore if a temperature of about 900 degrees is maintained within the kiln drum, the removal of all carbon without injury to the material is assured.

Careful tests have shown that such degree of heat, to wit, about 900 degrees, will automatically maintain itself when the material delivered to the kiln has at least 4 per cent carbon and an excess of about 245 per cent of air is supplied. In such case only enough heat would have to be generated in the furnace fire-box 5 to off-set the radiation losses. If a wash of the material, before treatment, was so good that a less carbon content would accompany the material into the kiln drum, then a little more heat would have to be generated and supplied from the furnace fire-box; if, on the other hand, the wash was so poor, that an excess of carbon content existed, then the furnace fire would have to be withdrawn altogether after the reaction between the carbon and the oxygen is set up. In case there existed a carbon content to excess tending to the generation of too high a temperature within the kiln drum, the temperature can be controlled and maintained at the desired 900 degrees by admitting a small spray of water into the kiln drum, for which purpose I provide a water supply pipe 33 arranged to enter the kiln drum 3 through its discharge end. A thermocouple inserted in the kiln drum would readily serve as an index to the amount of water necessary to be admitted for the required temperature reduction and control.

From the above description it will be apparent that my revivifying apparatus is of a novel character adapted to efficiently operate upon material in practically any condition from a good to a very poor wash.

I am aware that some changes may be made in the construction of the apparatus as above described and as illustrated in the drawings, without departing from the scope of and while still retaining the general principles of my present invention. Hence, I do not limit my invention to the exact arrangements and construction of parts, as described in the foregoing specification, nor do I confine myself to the exact details of the construction of the various parts as illustrated in the accompanying drawings.

I claim:—

1. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and said kiln drum, and a material cooling means in communication with the discharge end of said kiln drum.

2. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and kiln drum, a material cooling means in communication with the discharge end of said kiln drum, and means inducing a counter current of air to enter through said cooling means and travel through said kiln drum and thence through said drier drum.

3. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and kiln drum, a material cooling means in communication with the discharge end of said kiln drum, means inducing a counter current of air to enter through said cooling means and travel through said kiln drum and thence through said drier drum, and a water spray delivery means entering said kiln drum.

4. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and kiln drum, means inducing a counter current of air to travel through said kiln drum and thence through said drier drum, and a water spray delivery means entering said kiln drum.

5. In an apparatus of the kind described, a furnace housing having a kiln drum chamber in communication with the fire-box thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of said kiln drum, a communicating means between said discharge end of said drier drum and said receiving end of said kiln drum, the relation of said drums permitting the travel of material successively through said drier and kiln drum, and means inducing a counter current of air to travel through said kiln drum and thence through said drier drum.

6. In an apparatus of the kind described, a furnace housing having a kiln drum chamber in communication with the fire-box thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of said kiln drum, a communicating means between said discharge end of said drier drum and said receiving end of said kiln drum, the relation of said drums permitting the travel of material successively through said drier drum and kiln drum, means inducing a counter current of air to travel through said kiln drum and thence through said drier drum, and a water spray delivery means entering said kiln drum.

7. In an apparatus of the kind described, a furnace housing having a kiln drum chamber in communication with the fire-box thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of said kiln drum, a communicating means between said discharge end of said drier drum and said receiving end of said kiln drum, the relation of said drums permitting the travel of material successively through said drier drum and kiln drum, a material cooling means in communication with the discharge end of said kiln drum, and means inducing a counter current of air to enter through said cooling means and travel through said kiln drum and thence through said drier drum.

8. In an apparatus of the kind described, a furnace housing having a kiln drum chamber in communication with the fire-box thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of said kiln drum, a communicating means between said discharge end of said drier drum and said receiving end of said kiln drum, the relation of said drums permitting the travel of material successively through said drier drum and kiln drum, a material cooling means in communication with the discharge end of said kiln drum, means inducing a counter current of air to enter through said cooling means and travel through said kiln drum and thence through said drier drum, and a water spray delivery means entering said kiln drum.

9. In an apparatus of the kind described, a furnace housing having a kiln drum chamber in communication with the fire-box thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of said kiln drum, a communicating means between said discharge end of said drier drum and said receiving end of said kiln drum, the relation of said drums permitting the travel of material successively through said drier drum and kiln drum, a material cooling means in communication with the discharge end of said kiln drum, means inducing a counter current of air to enter through said cooling means and travel through said kiln drum and thence through said drier drum comprising an exhaust fan, and means for connecting said exhaust fan with the receiving end of said drier drum.

10. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and kiln drum, a vertical cooler well having an arrangement of internal opposed and staggered baffle plates, the upper end of said cooler well being connected in communication with the discharge end of said kiln drum, and means inducing a counter current of air to enter through the lower end of said cooler well and to thence travel successively through said cooler well, kiln drum and drier drum.

11. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material succesively through said drier drum and kiln drum, a vertical cooler well having an arrangement of internal opposed and staggered baffle plates, the upper end of said cooler well being connected in communication with the discharge end of said kiln drum, means inducing a counter current of air to enter through the lower end of said cooler well and to thence travel successively through said cooler well, kiln drum and drier drum, and a water spray deivery means entering said kiln drum.

12. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and kiln drum, a vertical cooler well having an arrangement of internal opposed and staggered baffle plates, the upper end of said cooler well being connected in communication with the discharge end of said kiln drum, means inducing a counter current of air to enter through the lower end of said cooler well and to thence travel successively through said cooler well, kiln drum and drier drum, comprising an exhaust fan, and means for connecting said exhaust fan with the receiving end of said drier drum.

13. In an apparatus of the kind described, a rotary kiln drum and a rotary drier drum relatively mounted so that the discharge end of the latter is adjacent to the receiving end of the former, a communicating means between the discharge end of said drier drum and the receiving end of said kiln drum, such arrangement permitting the travel of material successively through said drier drum and kiln drum, a vertical cooler well having an arrangement of internal opposed and staggered baffle plates, the upper end of said cooler well being connected in communication with the discharge end of said kiln drum, means inducing a counter current of air to enter through the lower end of said cooler well and to thence travel successively through said cooler well, kiln drum and drier drum, comprising an exhaust fan, and means for connecting said exhaust fan with the receiving end of said drier drum, and a water spray delivery means entering said kiln drum.

14. In an apparatus of the kind described, a furnace housing having a kiln drum chamber in communication with the firebox thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of kiln drum, a communicating means interconnecting said discharge end of said drier drum with said receiving end of said kiln drum, means for feeding material into the receiving end of said drier drum the relation of said drums permitting the travel of material successively through said drier drum and kiln drum, a vertical cooler well having an arrangement of internal opposed and staggered baffle plates, the upper end of said cooler well being connected in communication with the discharge end of said kiln drum, and means inducing a counter current of air to enter through the lower end of said cooler well and to thence travel successively through said cooler well, kiln drum and drier drum.

15. In an apparatus of the kind described, a furnace housing having a kiln drum chamber in communication with the firebox thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum havings its discharge end adjacent to the receiving end of kiln drum, a communicating means interconnecting said discharge end of said drier drum with said receiving end of said kiln drum, means for feeding material into the receiving end of said drier drum the relation of said drums permitting the travel of material successively through said drier drum and kiln drum, a vertical cooler well having an arrangement of internal opposed and staggered baffle plates, the upper end of said cooler well being connected in communication with the discharge end of said kiln drum, means inducing a counter current of air to enter through the lower end of said cooler well and to thence travel successively through said cooler well, kiln drum and drier drum, and a water spray delivery means entering said kiln drum.

16. In an apparatus of the kind described, a furnace housing having a kiln drum chamber in communication with the firebox thereof, a rotary kiln drum extending longitudinally through said kiln drum chamber, a casing providing a drier drum chamber, a conduit interconnecting said kiln drum chamber with one end of said drier durm chamber, a flue stack communicating with the opposite end of said drier drum chamber, a rotary drier drum extending through said casing, said drier drum having its discharge end adjacent to the receiving end of kiln drum, a communicating means interconnecting said discharge end of said drier drum with said receiving end of said kiln drum, means for feeding material into the receiving end of said drier drum the relation of said drums permitting the travel of material successively through said drier drum and kiln drum, a vertical cooler well having an arrangement of internal opposed and staggered baffle plates, the upper end of said cooler well being connected in communication with the discharge end of said kiln drum, means inducing a counter current of air to enter through the lower end of said cooler well and to thence travel successively through said cooler well, kiln drum and drier drum comprising an exhaust fan, and means for connecting said exhaust fan with the receiving end of said drier drum.

17. In an apparatus of the kind described, a furnace housing having a kiln drum chamber in communication with the firebox thereof, a rotary kiln drum extending longitudinally through said kiln drum chamber, a casing providing a drier drum chamber, a conduit interconnecting said kiln drum chamber with one end of said drier drum chamber, a flue stack communicating with the opposite end of said drier drum chamber, a rotary drier drum extending through said casing, said drier drum having its discharge end adjacent to the receiving end of kiln drum, a communicating means interconnecting said discharge end of said drier drum with said receiving end of said kiln drum, means for feeding material into the receiving end of said drier drum the relation of said drums permitting the travel of material successively through said drier drum and kiln drum, a vertical cooler well having an arrangement of internal opposed and staggered baffle plates, the upper end of said cooler well being connected in communication with the discharge end of said kiln drum, means inducing a counter current of air to enter through the lower end of said cooler well and to thence travel successively through said cooler well, kiln drum and drier drum comprising an exhaust fan, and means for connecting said exhaust fan with the receiving end of said drier drum, and a water spray delivery means entering said kiln drum.

In testimony that I claim the invention set forth above I have hereunto set my hand this 16th day of April, 1920.

FREDERICK PEITER.

Witnesses:
GEORGE D. RICHARDS,
MARION M. BANTA.